May 26, 1931.  F. McCAW  1,807,221
FIBER PREPARING TREATMENT OF BAST OR VEGETABLE FIBER PLANTS
Filed July 25, 1929  4 Sheets-Sheet 1
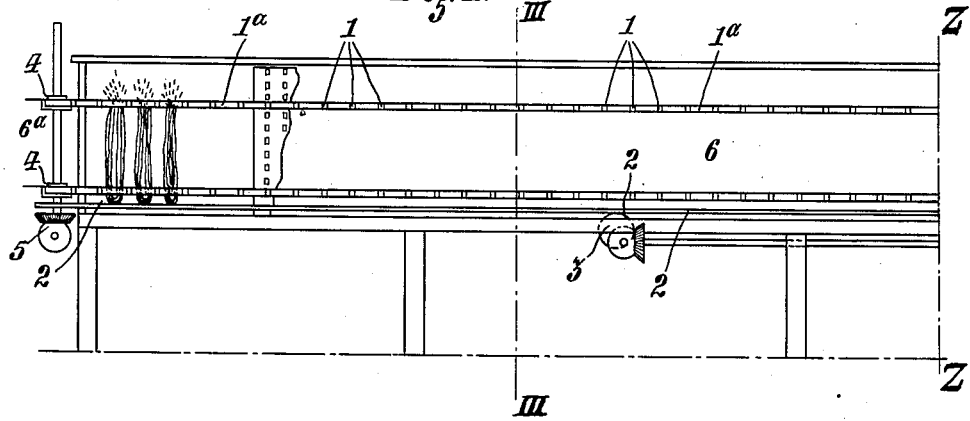
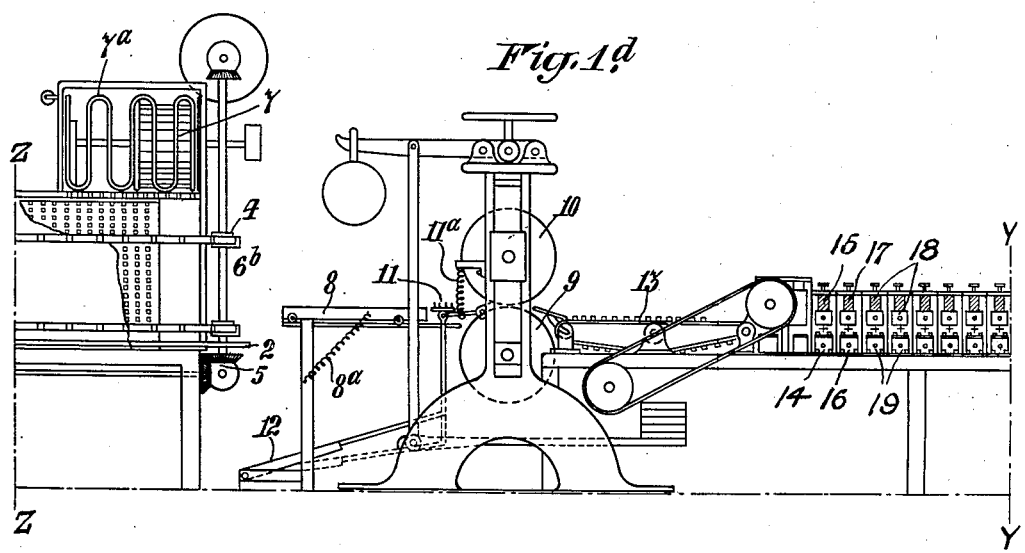
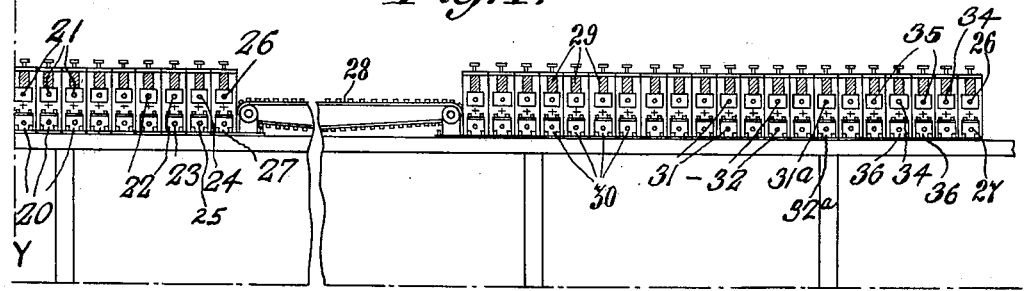
INVENTOR.
FREDERICK McCAW.
ATTORNEYS.

May 26, 1931. F. McCAW 1,807,221
FIBER PREPARING TREATMENT OF BAST OR VEGETABLE FIBER PLANTS
Filed July 25, 1929 4 Sheets-Sheet 2
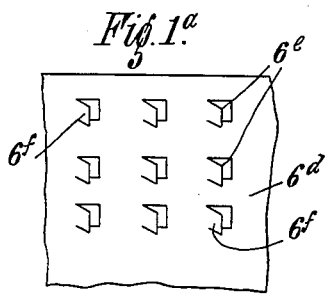
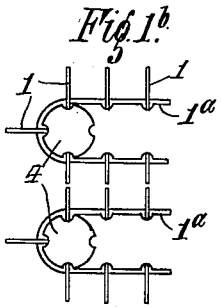
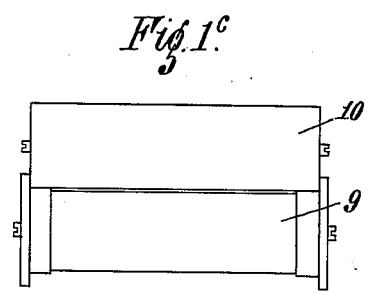
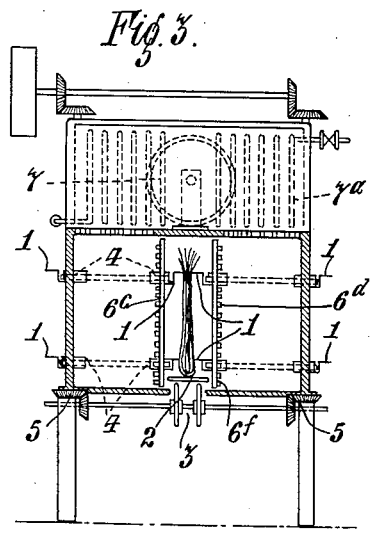
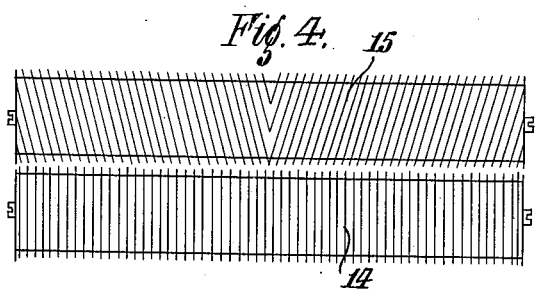
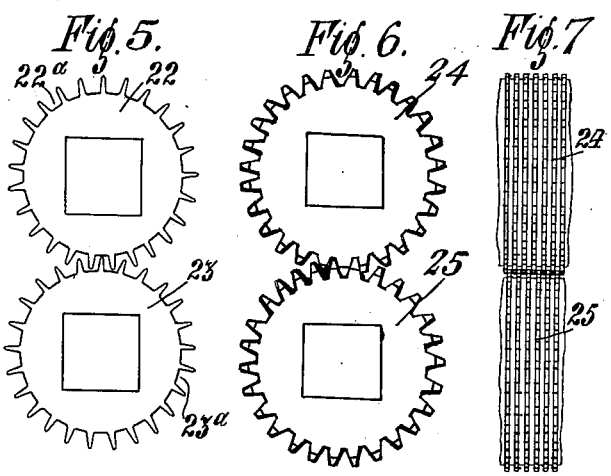
INVENTOR.
FREDERICK McCAW.
BY
ATTORNEYS.

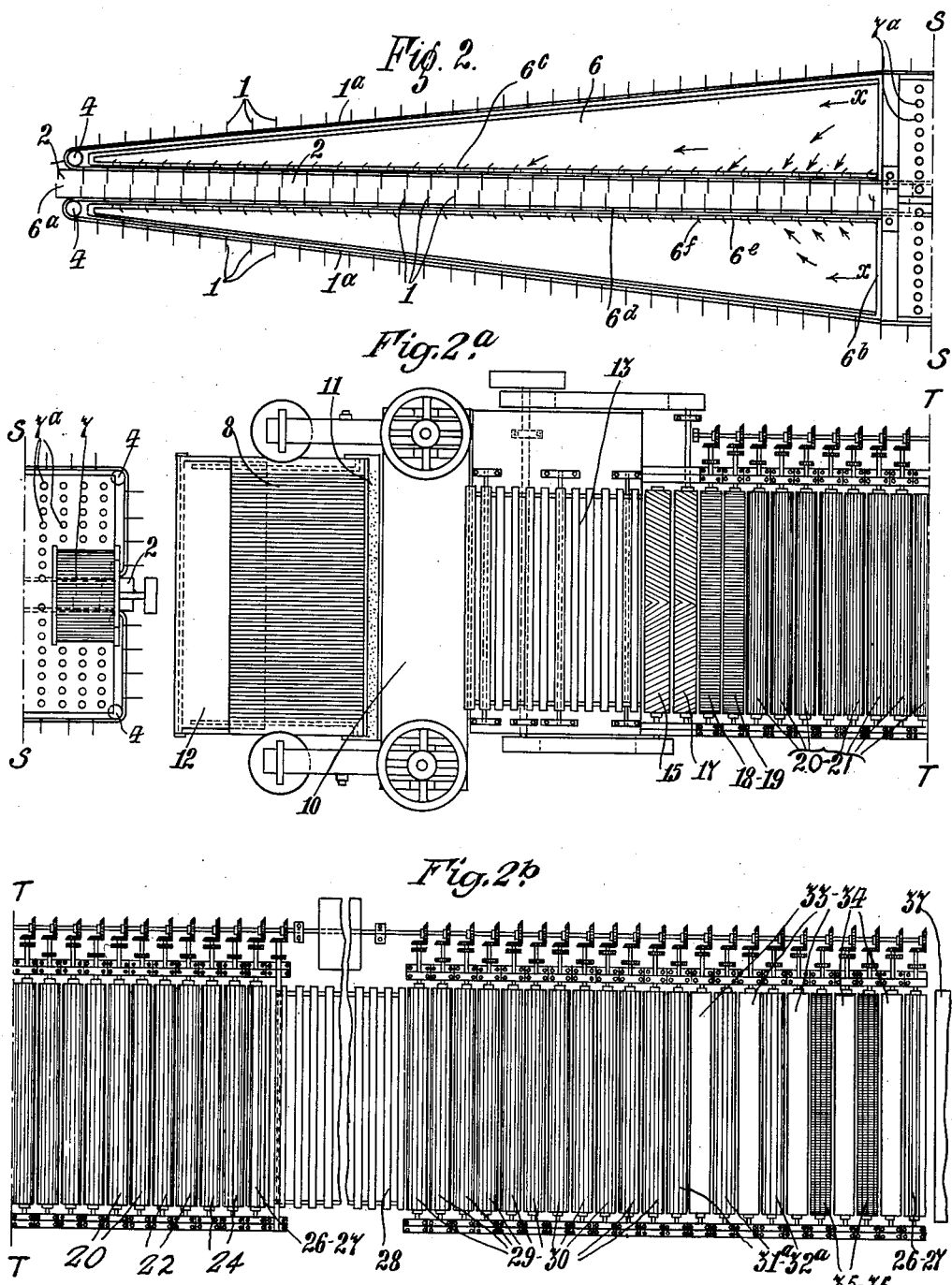

Patented May 26, 1931

1,807,221

UNITED STATES PATENT OFFICE

FREDERICK McCAW, OF BELFAST, NORTHERN IRELAND

FIBER-PREPARING TREATMENT OF BAST OR VEGETABLE FIBER PLANTS

Application filed July 25, 1929, Serial No. 380,944, and in Great Britain August 7, 1928.

This invention relates to the treatment of bast or vegetable fiber plants, its object being to provide improvements in apparatus for the deseeding and decortication, and other treatments, of such fibrous material.

A further object of this invention is to provide apparatus for treating such plants as flax and the linseed flax plants and "Guildford grass", for deseeding and decorticating them, removing the shive or woody part of the stem, and scraping and combing the fibers—after they have been dried in the sun, field or stock. The usual water retting, dew retting or chemical retting of the plants, may be dispensed with although the invention, if desired, can also be used for, and is most suitable for, the treatment of retted plants.

Other and further objects will appear throughout the specification.

Apparatus in accordance with this invention comprises in combination, means for conveying bundles of the material in a substantially vertical position, means for subjecting said bundles to a jigging motion adapted to level the lower ends of the bundles, means for crushing the material, means for spreading the material, and means for decorticating the material including fluted breaking rollers, bladed combing rollers and scutching and stripping rollers.

The means for spreading, decorticating and other treatment of the fibrous material preferably takes the form of fluted, bladed, threaded or other rollers.

The invention will now be described with reference to the accompanying drawings whereon a combined plant and fiber drying apparatus and mechanical treatment plant, in accordance with the invention, is shown by way of example.

Fig. 1 is an elevation, partly in section, of part of the complete apparatus.

Fig 1ª is a fragmental view of one of the partitions in the heat treatment flume.

Fig. 1ᵇ is a fragmental view of the conveyors used in the heating treatment flume.

Fig. 1ᶜ is a diagrammatic view of the pair of crushing rollers hereinafter described.

Fig. 1ᵈ is an elevation, partly in section, of a further part of the complete apparatus, namely a continuation of the apparatus shown in Fig. 1, to the right of the line Z—Z.

Fig. 1ᵉ is an elevation, partly in section, of a further part of the complete apparatus, namely a continuation of the apparatus shown in Fig. 1ᵈ to the right of the line Y—Y.

Fig. 2 is a plan view corresponding to Fig. 1.

Fig. 2ª is a plan view corresponding to Fig. 1ᵈ, the line S—S corresponding to the line Z—Z, Fig. 1ᵈ.

Fig. 2ᵇ is a plan view corresponding to Fig. 1ᵉ, line T—T corresponding to the line Y—Y, Fig. 1ᵉ.

Fig. 3 is a sectional view of the drying flume on the line III—III, Fig. 1.

Fig. 4 is a detail view of a spreading roller and the holding roller underneath same.

Fig. 5 is a detail cross sectional view of a pair of fluted rollers.

Fig. 6 shows another form of the fluted rollers built up of discs with interspacing discs of lesser diameter.

Fig. 7 is a view corresponding to Fig. 6 and showing more detail of the construction of these rollers.

Figure 14:
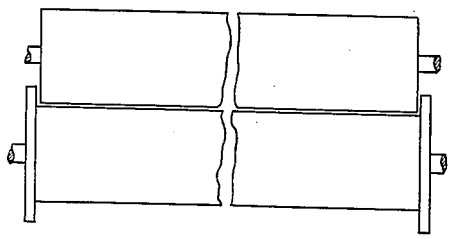

At Fig. 14 a pair of rollers are shown in elevation and showing the under rollers with end flanges, to prevent spreading of plants beyond the ends of the rollers.

The bast and/or vegetable fiber plants to be treated by this invention, are first arranged in suitable "handfuls" and delivered to the vertically projecting interacting fingers or finger clips 1. The plants are delivered to the fingers 1 with the roots downwards, and the roots are allowed to rest on a bottom board support 2 projecting about 18 inches at each end of the flume. A jigging motion is applied to this board by means of a cam arrangement or jigging motion 3 which is shown in elevation in Fig. 3 of the drawings. The fingers 1 are carried on suitably supported belts $1^a$ and the belts $1^a$ are operated by suitably recessed flanged wheels 4 driven by bevel gearing 5 which receives its drive from the main driving shaft or counter shaft of the machine, preferably through readily variable gear, or otherwise. The belts $1^a$ pass into a flume or chamber 6 which, in the example shown, has outer walls which taper outwardly from the inlet end $6^a$ to the outlet end $6^b$. Preferably the flume 6 has its outer walls lagged with insulating material, and it is divided into three compartments by means of vertical plates or partitions $6^c$ and $6^d$. These partitions are arranged on each side of the jigging board 2 and the partitions $6^c$ and $6^d$ are provided with openings $6^e$ and baffles $6^f$ adapted to focus or direct hot air which is forced along in the direction of the arrows $x$ from a fan 7 which drives the air through a battery of hot pipes $7^a$ forming an air heater at the end $6^b$ of the flume 6. The hot air is delivered to the space between the outer sides of the partitions $6^c$ and $6^d$ and the main outer walls of the flume, and the hot air enters the passage between the partitions $6^c$ and $6^d$ through the graduated holes $6^e$ in the partitions, being directed therethrough by the baffles $6^f$, see detail view Fig. $1^a$. The gradually tapering space of the outer walls of the flume towards the inlet end ensures that the hot air discharged into the central compartment of the flume at the end $6^b$, will be concentrated on the material passing through the flume 6, as uniformly as possible throughout the length of time the material is passing from the inlet end $6^a$ to the outlet end $6^b$. The partitions $6^c$ and $6^d$ are removable or provided with shutters so that they can be arranged of any desired height to suit the nature and height of the plants being treated, so that the flume can be adjustable to suit the height of plants which it is desired to treat therein. For this purpose also the belt wheels, belts and fingers 1 are preferably adjustable on their vertical spindles so that they can be adjusted to handle properly any desired length of plants.

Again reverting to the treatment of plants, the "handfuls" from the flume 6, passing out at the end $6^b$ are taken from the fingers 1 by the operator and roughly or partly spread by hand on a fluted spreading table 8 with the roots facing in the direction towards the nip of a mangle-like pair of rollers 9 and 10. The table 8 is slidably supported by wheels on rails, so that the plants can be moved to the nip of the rollers 9 and 10 without being disturbed. The return of the table 8 is obtained automatically by a spring $8^a$, leaving the operator free to turn for the next "handful". The lower roller 9 supports the upper roller 10, and between the rollers there is a slight gap (see Fig. $1^c$) for example, $\frac{1}{64}$ to $\frac{1}{32}$ of an inch, so that while the plants are effectively flatened or crushed by adjustable pressure applied to the rollers 9 and 10 they are not cut or damaged thereby. Before or while passing through the rollers 9 and 10 the plants are acted on by a de-seeding device 11 which is normally in its "action" position through the action of a spring $11^a$, and it is brought out of action by a pedal step 12 on which the operator steps when presenting the plants to the nip of the rollers 9 and 10. As soon as the operator has presented the plants to, and engaged them in, the nip of the rollers 9 and 10 he steps off the pedal step 12 and so allows the spring $11^a$ to bring the de-seeding prongs or pins 11 into their "action" position whereupon the pressure of the rollers and the pulling of the plants therethrough will cause the seed or bolls to be removed by the prongs 11. On leaving the mangle rollers 9 and 10 the plants may pass directly to one or more right and left hand spiral threaded spreading rollers hereinafter described, or preferably first on to a travelling feed table 13 and then to the spreading rollers. This feed table is preferably made of wood apron linked together by chains and geared into sprocket wheels.

The travelling table 13 is driven by bevel and pinion gear at suitable speed, and in operation gives a continuous positive feed movement of the plants over the feed table towards the nip of a pair of rollers 14 and 15, the upper roller 15 being a spreading roller and consisting of a roller threaded with right hand and left hand spiral threads (see Fig. 4) commencing at the centre and threaded therefrom right and left hand to each end. The threads are provided on this roller at a suitable pitch, for example, 2 to 5 to the inch, and having a straight or suitable bevel angle or cant. The threads on the spiral threaded spreading roller are cut into the surface of the roller. The spreading roller 15 works over the metal roller 14 which has circular gaps. The bridge is about $\frac{1}{32}$ of an inch wide and the recess about $\frac{1}{8}$ to $\frac{1}{4}$ inch. The action of this bottom roller is to receive the spread plants into its recesses and assist in uniformly spreading the plants and giving a forward feeding movement to the plants. The spreading and gapped rollers 15 and 14 are shown at Fig. 4. These rollers are arranged about $\frac{1}{64}$ or $\frac{1}{32}$ of an inch apart. The spreading roller 15 is driven at a greater speed than the gapped or recessed roller 14 so that the former, while spreading the plans from the centre to right and left across the under roller 14 also acts as a feed roller passing the plants into the nip of the next pair of rollers.

The drive of the spreading rollers 15 and 17 is obtained to give infinite variation in speed to suit the lengths of plants being treated, for example, a pair of wide belt cones is used to give any desired readily variable speed.

The plants after passing the spreading rollers pass to the breaking or decorticating fluted rollers and the linear speed of the plants through the fluted or decorticating rollers is so arranged as to be uniform or as nearly uniform as possible, and for this purpose the speed of the rollers varies according to the sizes of the flutes thereon. The rollers are mounted in pairs, each pair of rollers being only about $\frac{1}{16}$ of an inch or less distant from the next pair to ensure that the material will pass on from pair to pair and not lap round the rollers or drop between them. The first unit comprises a series of different types of rollers arranged in the following order and varying in speed according to the sizes of the flutes. In known manner suitable adjusting means is provided to keep the fluted rollers and the other rollers, hereinafter described, from actually bottoming at the nip or riding hard on each other. Suitable pressure means is provided in known manner to give resilience to the rollers and the desired pressure on the plants or fiber as the case may be:—

One or a series of pairs of threaded rollers 18 and 19 with any required number of threaded circles per inch of roller, and adapted for treatment of the fiber in its longitudinal length.

A series of fluted rollers 20 and 21 with about ⅜ of an inch oval or square bridges and square gaps for breaking the plants.

A series of fluted rollers 20, 21 with about $\frac{5}{16}$ of an inch oval or square bridges and square gaps for breaking the plants.

A series of fluted rollers 20, 21 with about ¼ of an inch oval or square bridges and square gaps for breaking the plants and partly removing the shive or woody part of the plants.

A series of specially cut discs mounted on a spindle and bolted together forming rollers 22—23 combined in any desired order with similar rollers 24—25 having specially shaped discs interspaced with discs of lesser diameter and of thicker gauge, for example, with the profile discs 3 inches diameter and interspacing discs say $2\frac{15}{16}$ of an inch in diameter. When mounted on a spindle and bolted together these discs form a fluted roller having a breaking and bursting action. A series of knife bladed rollers 26—27 assist in removing the shive or woody part of the plants and also act as stripping rollers to strip the plant and material from the end rollers of the unit and deposit same on a travelling conveyor 28 which leads to the second unit.

The second unit comprises a series of finer fluted rollers, knife bladed rollers and scraping and combing rollers arranged preferably in the following order, namely:—

A series of fluted rollers 29—30 having about ¼ to $\frac{3}{16}$ of an inch flutes, preferably with square shaped gaps and adapted to break and partly remove the shive from the plants.

A series of knife bladed rollers and scraping discs of fine gauge mounted in the form of rollers and arranged in pairs 31—32 and 31ª—32ª. These rollers with the scraping discs are mounted on a spindle with or without interspacing discs between and are adapted for scraping or combing the fiber and removing the shive or wood. Each pair of these rollers is followed by a pair of fluted rollers 33—34 (see plan view Fig. 2). These fluted rollers travel at a standard speed and act as tension rollers rotating at less speed than the rollers which precede them.

Following the knife bladed and scraping disc rollers are a series of fine combing discs mounted on a spindle and forming rollers 35. The discs are put on of fine gauge and may be about 30 to 50 per inch with interspacing discs of similar diameter and greater gauge. The combing projections on the discs forming the rollers 35 may be in the same vertical plane, or may be staggered to left and right of the central vertical plane of the disc. These combing bladed teeth or projections rotate in between or in mesh with bottom rollers 36 which bottom rollers comprise a series of circular discs with interspacing discs of lesser diameter between same. The upper rollers 35 travel at a greater speed than the speed of the under rollers 36. Each pair of these rollers is followed by a pair of the plain pressure rollers.

The combing rollers just described, are followed, or may be interspaced by, one or a series of pairs of knife bladed rollers similar to the stripping rollers 26—27 at the end of the first unit of the apparatus.

These knife bladed rollers complete the operation of removing the shive and wood from the plants and also strip the fiber from the rollers, delivering same on to a suitable delivery table or conveyor 37 from which the fiber can be passed to any subsequent process. The knife bladed rollers travel at relatively higher speed than the scraping and combing discs.

The various types of rollers hereinbefore referred to will now be described in detail with reference to the detail views in the drawings.

At Fig. 5 a detail cross sectional view is given of a pair of fluted rollers 22—23. The flutes on the fluted rollers vary with the requirements. Preferably I employ first a series of fluted rollers having 3/8 of an inch pitch flutes, whilst the second series have 5/16 of an inch pitch flutes. The fluted rollers 22—23 shown in the drawings have rounded bridges with square gaps. They can be made of case hardened steel either in the form of solid fluted rollers, or made up of a plurality of hardened steel discs mounted on a spindle so that when bolted together they form a fluted roller such as 22—23, the surface and sides of the gaps 22$^a$ and 23$^a$ being even and smooth.

Another form of the fluted rollers is shown at Fig. 6. In this case the fluted rollers 24—25 have interspacing discs of lesser diameter interspaced with the profile discs and thereby forming gaps between the profile discs. The interspacing discs are of thicker gauge than the profile discs, so that the bridge of the flutes will have an irregular or comb or toothed surface as shown in elevation at Fig. 7, being adapted to give a bursting and breaking action to the plants.

Figure 8:
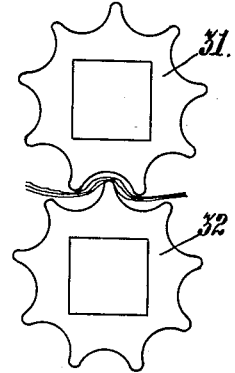
Fig. 8 is a cross sectional view of a pair of fluted rollers with specially cut discs and deep flutes.
Figure 9:
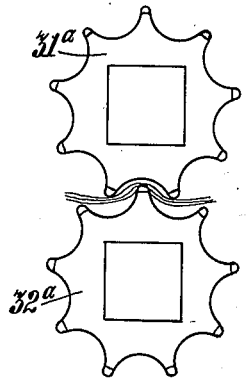
Fig. 9 is a cross sectional view of a pair of fluted rollers similar to Fig. 8, but with interspacing discs of lesser diameter as shown in the further detail view at Fig. 10.
Figure 10:
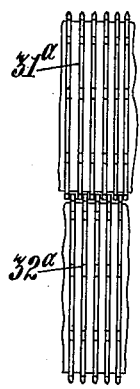

After any desired number of the fluted rollers described, or similar rollers with flutes varying from 3/16 to 3/8 of an inch pitch, there follows a series of specially cut discs as shown in section at Fig. 8 mounted on a spindle and bolted together to form rollers 31—32. Similar rollers 31$^a$—32$^a$ as shown in section at Fig. 9 and in elevation at Fig. 10 are provided having the specially shaped discs interspaced with discs of lesser diameter and of thicker guage which, when mounted on a spindle and bolted together form the fluted rollers 31$^a$—32$^a$ which have a scraping and combing action on the plants.

A graded increase of speed is given to the knife bladed rollers, scraping disc, and combing disc rollers following the plain fluted rollers in the second unit of the machine.

Figure 11:
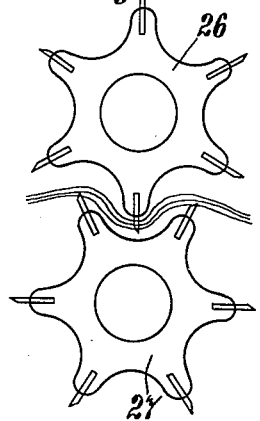
Fig. 11 is a cross sectional elevation of a pair of scutching or scraping rollers having longitudinal blades, i. e., longitudinal in respect to the axis of the roller.

At the end of the first unit and also at the end of the second unit of the decorticating rollers there is provided a series of knife bladed rollers 26—27 as shown in cross section at Fig. 11, and which assist in removing the shive or woody part of the plants and also act as stripping rollers or stripping blades to strip the plant and material from the end rollers of the units and deposit same on to travelling conveyors or a receiving table.

Figure 12:
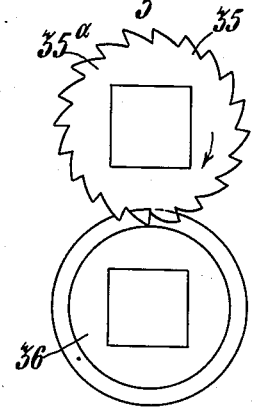
Fig. 12 is a cross sectional elevation of a combing roller mounted on a suitably gapped roller. Another detail view of the combing roller is shown at Fig. 13.
Figure 13:
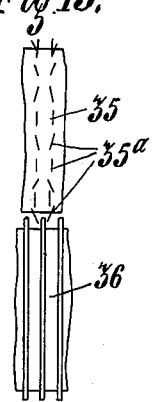

The fluted rollers 29 and 30 have, for example, flutes of about 3/8 to 3/16 of an inch and are followed by knife bladed scraping or combing rollers 26—27, 31$^a$—32$^a$ and 35—36. These fluted rollers may be used where required as tension rollers to hold the material tight and they rotate at a speed suitable to the desired linear speed of the plants or fiber through the machine. In the second unit, following the scraping disc rollers 31—32 are a series of combing disc rollers 35 shown in detail at Fig. 12 in cross section and in elevation at Fig. 13. The rollers 35 consist of a plurality of discs with interspacing discs, between, which interspacing discs are of smaller diameter and greater guage. The larger or profile discs have teeth or projections formed thereon, the teeth being rounded on one side as shown, the rounded side of the tooth 35$^a$ being in the direction of travel of the material. The teeth 35$^a$ may be staggered to left and right of the vertical central plane of the disc and such staggered teeth may alternate with teeth arranged centrally as shown in the detailed elevation Fig. 13. The combing teeth or blades 35$^a$ rotate in or mesh with the gaps in an under roller 36 which comprises a series of circular discs with spacing discs between same. The upper rollers 35 travel at a greater speed than the speed of the under rollers 36 to ensure the desired combing action. These combing rollers are followed by a pair of plain pressure rollers 33—34, which, at the end of the unit are followed by one or a series of longitudinal bladed rollers similar to the stripping rollers 26—27 at the end of the first unit. These longitudinal bladed rollers 26—27 complete the operation of removing the shive and wood from the plants and also strip the fiber from the rollers delivering them on to a suitable delivery table or conveyor 37 from which the fiber can be passed to any subsequent process.

To prevent the plants spreading over the ends of rollers, the under roller of any pair of rollers may, as shown in detail at Fig. 14, be provided with end flanges to prevent the material spreading beyond the ends of the rollers.

Any or all of the rollers hereinbefore described, can be constructed of, or on, hollow tubes or shafts with suitable end pieces and journals for bearings and for driving of the rollers. By making the rollers hollow a saving in weight is obtained and also a saving in driving power. The hollow rollers are particularly suitable for the finer fluted rollers. The deeper fluted rollers and the specially cut disc rollers do not so readily lend themselves to hollow construction of the supporting tube or spindle.

I claim:

1. Apparatus for the treatment of fibrous material, comprising in combination means for conveying bundles of the material in a substantially vertical position, means for subjecting said bundles to a jigging motion adapted to level the lower ends of the bundles, means for crushing the material, means for spreading the material, and means for decorticating the material including fluted breaking rollers, bladed combing rollers and scutching and stripping rollers.

2. Apparatus for the treatment of fibrous material, comprising in combination means for conveying bundles of the material in a substantially vertical position, means for drying said material, means for subjecting said bundles to a jigging motion adapted to level the lower ends of the bundles, means for crushing the material, means for spreading the material, and means for decorticating the material including fluted breaking rollers, fluted scraping rollers, bladed combing rollers and scutching and stripping rollers.

3. Apparatus for the treatment of fibrous material, comprising in combination means for conveying bundles of the material in a substantially vertical position, means for drying said material, means for subjecting said bundles to a jigging motion adapted to level the lower ends of the bundles, means for de-seeding said material if necessary, means for crushing the material, means for spreading the material, and means for decorticating the material including fluted breaking rollers, fluted scraping rollers, bladed combing rollers and scutching and stripping rollers.

4. Apparatus for the treatment of fibrous material, comprising in combination means for conveying bundles of the material in a substantially vertical position, means for drying said material, means for subjecting said bundles to a jigging motion adapted to level the lower ends of the bundles, means for crushing the material, at least one pair of spreading rollers vertically superposed one over the other each having right and left hand threads thereon and each upper roller being adapted to rotate faster than the corresponding lower roller giving a spreading feed motion, and means for decorticating the material including fluted breaking rollers, fluted scraping rollers, bladed combing rollers and scutching and stripping rollers.

5. Apparatus for the treatment of fibrous material, comprising in combination means for conveying bundles of the material in a substantially vertical position, means for drying said material, means for subjecting said bundles to a jigging motion adapted to level the lower ends of the bundles, means for crushing the material, means for spreading the material, and means for decorticating the material including fluted breaking rollers, a series of rollers each formed of cut discs mounted on a spindle and bolted together, corresponding similar disc rollers having profile discs and interspacing discs of lesser diameter and thicker gauge than said profile discs, the two latter sets of rollers being formed in intermeshing pairs and adapted to break, burst, scrape and comb the material.

6. Apparatus for the treatment of fibrous material, comprising in combination means for conveying bundles of the material in a substantially vertical position, a flume for drying said material, means for supplying heated air to said flume, means for subjecting said bundles to a jigging motion adapted to level the lower ends of the bundles, means for crushing the material, means for spreading the material, and means for decorticating the material including fluted breaking rollers, fluted scraping rollers, bladed combing rollers and scutching and stripping rollers.

7. Apparatus for the treatment of fibrous material, comprising in combination means for conveying bundles of the material in a substantially vertical position, a flume for drying said materials, means for supplying heated air to said flume in a graduated and directed manner, means for subjecting said bundles to a jigging motion adapted to level the lower ends of the bundles, means for crushing the material, means for spreading the material, and means for decorticating the material including fluted breaking rollers, fluted scraping rollers, bladed combing rollers and scutching and stripping rollers.

8. Apparatus for the treatment of fibrous material, comprising in combination means for conveying bundles of the material in a substantially vertical position, a flume for drying said material, means for supplying heated air to said flume, means for adjusting the size of the flume passage for the material, means for subjecting said bundles to a jigging motion adapted to level the lower ends of the bundles, means for crushing the material, means for spreading the material, and means for decorticating the material including fluted breaking rollers, fluted scraping rollers, bladed combing rollers and scutching and stripping rollers.

9. In apparatus for decorticating fibrous materials; combing means comprising in combination, upper rollers consisting of bladed discs mounted on spindles, the blades of each disc all being in the same vertical plane around the periphery of the disc, said discs being interspaced on each roller with discs of smaller diameter, but greater gauge, bottom rollers with which said upper rollers work over and intermesh, comprising a plurality of circular discs with interspacing discs of lesser diameter but of greater gauge, the upper rollers being adapted to rotate at a greater speed than that of the bottom rollers.

10. In apparatus for decorticating fibrous materials, combing means comprising in combination, upper rollers consisting of bladed discs mounted on spindles, the blades of each disc being staggered around the periphery of the disc, said discs being interspaced on each roller with discs of smaller diameter, but greater gauge, bottom rollers with which said upper rollers work over and intermesh, comprising a plurality of circular discs with interspacing discs of lesser diameter but of greater gauge, the upper rollers being adapted to rotate at a greater speed than that of the bottom rollers.

11. In apparatus for decorticating fibrous materials; breaking and bursting means comprising at least one pair of coacting fluted rollers, each roller consisting of a series of toothed profile discs interspaced with toothed discs of lesser diameter but thicker gauge, whereby the bridge of the flutes has an irregular surface, all the discs being mounted on a common spindle and secured together.

In testimony whereof I affix my signature.
FREDERICK McCAW.